United States Patent
Tanno et al.

(10) Patent No.: US 7,920,235 B2
(45) Date of Patent: Apr. 5, 2011

(54) LIQUID CRYSTAL DISPLAY DEVICE HAVING A PROTRUSIVE FILM FORMED OVER A PHASE PLATE IN A REFLECTIVE PIXEL REGION

(75) Inventors: Junji Tanno, Chiba (JP); Osamu Ito, Hitachi (JP)

(73) Assignee: Hitachi Displays, Ltd., Chiba (JP)

( * ) Notice: Subject to any disclaimer, the term of this patent is extended or adjusted under 35 U.S.C. 154(b) by 104 days.

(21) Appl. No.: 12/210,601

(22) Filed: Sep. 15, 2008

(65) Prior Publication Data
US 2009/0009700 A1  Jan. 8, 2009

Related U.S. Application Data

(63) Continuation of application No. 11/224,966, filed on Sep. 14, 2005, now Pat. No. 7,425,395.

(30) Foreign Application Priority Data
Sep. 29, 2004 (JP) ................................. 2004-283577

(51) Int. Cl.
*G02F 1/1335* (2006.01)
(52) U.S. Cl. ...................................... 349/114; 349/117
(58) Field of Classification Search .................. 349/114, 349/99–103, 106–108
See application file for complete search history.

(56) References Cited

U.S. PATENT DOCUMENTS

| | | | |
|---|---|---|---|
| 2,489,326 A | 11/1949 | Rockstrom et el. | |
| 3,017,807 A | 1/1962 | Grover | |
| 3,179,018 A | 4/1965 | Rumsey | |
| 5,220,447 A | 6/1993 | Yokokura et al. | |
| 5,854,665 A | 12/1998 | Iba | |
| 6,016,178 A | 1/2000 | Kataoka et al. | |
| 2001/0004276 A1* | 6/2001 | Urabe et al. | 349/106 |
| 2003/0038909 A1* | 2/2003 | Ikeno et al. | 349/113 |
| 2004/0125301 A1* | 7/2004 | Lee | 349/141 |
| 2004/0233357 A1* | 11/2004 | Fujimori et al. | 349/113 |
| 2005/0030450 A1* | 2/2005 | Okamoto et al. | 349/113 |
| 2007/0132916 A1 | 6/2007 | Itou et al. | |

* cited by examiner

Primary Examiner — Mark A Robinson
Assistant Examiner — Paul C Lee
(74) Attorney, Agent, or Firm — Antonelli, Terry, Stout & Kraus, LLP.

(57) ABSTRACT

A liquid crystal display device includes a first substrate and a second substrate with a liquid crystal material sandwiched therebetween, a pixel having an optically transmissive portion and an optically reflective portion, a phase plate which is formed between the second substrate and the liquid crystal material in the optically transmissive portion of the pixel, and a color filter which is formed between the second substrate and the liquid crystal material in the optically transmissive portion of the pixel and between the phase plate and the liquid crystal material in the optically reflective portion of the pixel. A counter electrode is formed between the color filter and the liquid crystal material, and a pixel electrode is formed between the first substrate and the liquid crystal material. An electric field which is produced by a voltage between the pixel electrode and the counter electrode induces behavior of the liquid crystal material.

9 Claims, 4 Drawing Sheets

LIQUID CRYSTAL DISPLAY DEVICE HAVING A PROTRUSIVE FILM FORMED OVER A PHASE PLATE IN A REFLECTIVE PIXEL REGION

CROSS REFERENCE TO RELATED APPLICATION

This application is a continuation application of U.S. application Ser. No. 11/224,966, filed Sep. 14, 2005 now U.S. Pat. No. 7,425,395, the contents of which is incorporated by reference herein.

BACKGROUND OF THE INVENTION

1. Field of the Invention

The present invention relates to a liquid crystal display device and, more particularly, to a liquid crystal display device having a phase plate.

2. Description of the Related Art

In some known reflective liquid crystal display devices, phase plates or phase shifters are disposed on surfaces located opposite to the liquid-crystal sides of substrates which are disposed opposite to each other with a liquid crystal material sandwiched therebetween. Furthermore, a structure in which phase plates are disposed on the liquid-crystal sides of substrates and thus the phase plates are incorporated within a liquid crystal display device is known, as disclosed in JP-A-9-146124 (and corresponding U.S. Pat. No. 6,016,178).

SUMMARY OF THE INVENTION

In the liquid crystal display device of the structure described above, each phase plate is formed on the upper surface of a color filter and designed as a layer underlying an orientation film.

It has been confirmed, however, that the phase plates in this structure cannot fully exhibit their functions. Research into the cause has revealed that when the orientation film is formed after formation of the phase plates, the used liquid solution melts the surface of each phase plate whose slow axis has been already set.

In view of these circumstances, the present invention has been made. It is an advantage of the invention to provide a liquid crystal display device having a phase plate which can fully exhibit its functions.

Typical aspects of the present invention disclosed herein are briefly described below.

(1) In a liquid crystal display device according to the present invention, substrates are disposed on the opposite sides of a liquid crystal material. A phase plate is formed on the liquid-crystal side surface of one of the substrates. The phase plate is covered with color filters.

(2) Another liquid crystal display device according to the invention has substrates disposed on the opposite sides of a liquid crystal material. The liquid crystal display device also has pixels each having optically transmissive and reflective portions. On the liquid-crystal side surface of one substrate, a phase plate is formed in the regions of the optically reflective portions. Color filters are successively formed in the regions of the optically transmissive and reflective portions from the substrate side. A protrusive film is formed in the regions of the optically reflective portions and in a layer located over the color filters. A reflective electrode is formed in regions of the optically reflective portions of the liquid-crystal side surface of the other substrate.

(3) A further liquid crystal display device according to the invention is based on, for example, the configuration of the liquid crystal display device (2) above and further characterized in that the protrusive film and the reflective electrode protrude successively increasing amounts from the peripheries of the phase plate.

(4) A yet other liquid crystal display device according to the invention is based on, for example, the configuration of the liquid crystal display device (2) above and further characterized in that the protrusive film and the reflective electrode protrude successively increasing amounts from the peripheries of the phase plate within effective pixel regions.

(5) A yet further liquid crystal display device according to the invention is based on, for example, the configuration of the liquid crystal display device (2) above and further characterized in that the color filters are made thinner in portions where the color filters overlap the phase plate than in portions where the color filters do not overlap the phase plate.

It is to be understood that the present invention is not limited to these configurations and that various changes and modifications can be made without departing from the technical concept of the present invention.

DETAILED DESCRIPTION OF THE INVENTION

Embodiments of the liquid crystal display device according to the present invention are hereinafter described with reference to the drawings.

Figure 1:
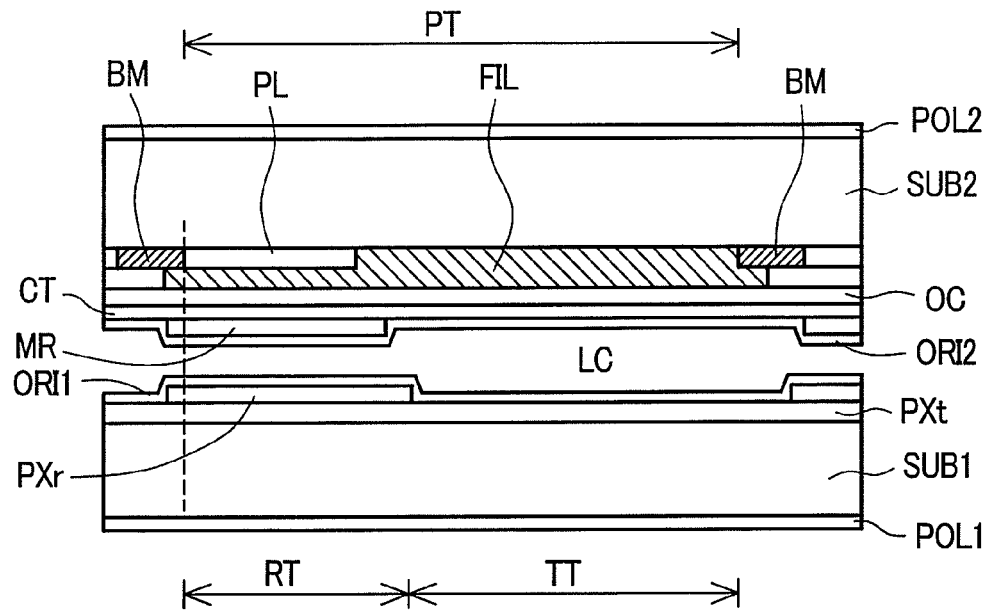
FIG. 1 is a cross section of a liquid crystal display device according to the present invention, taken on line I-I of FIG. 2, showing one example of the configuration of the device.
Figure 2:
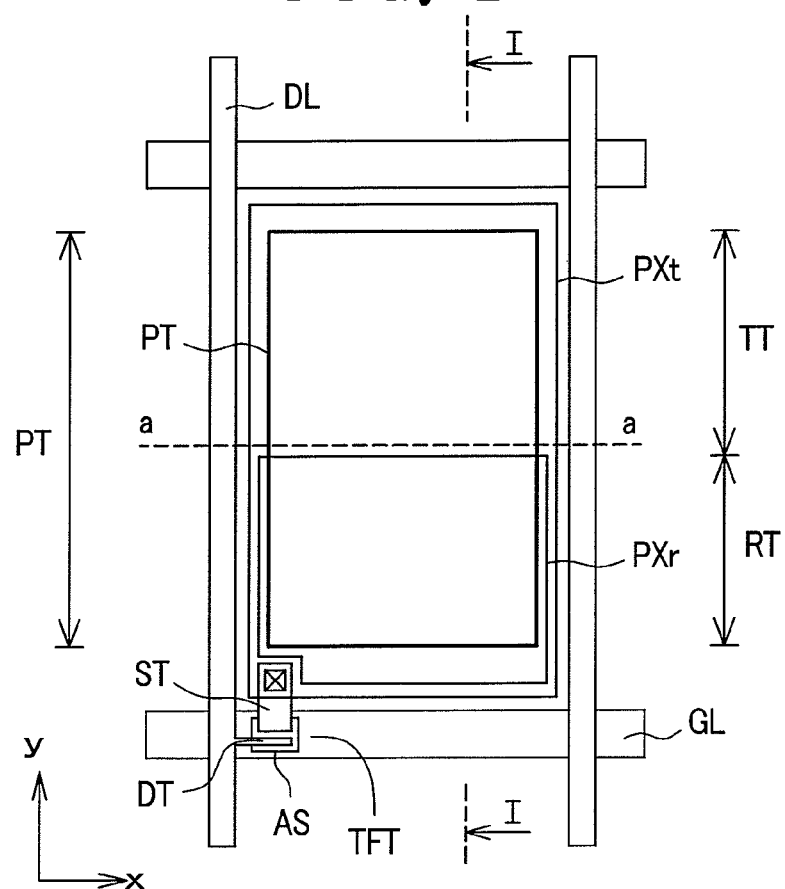
FIG. 2 is a plan view of the liquid crystal display device according to the invention, showing one example of the pixel structure.

FIG. 2 is a plan view showing one example of the pixel structure of the liquid crystal display device according to the invention. In the liquid crystal display device, pixels are arranged in a matrix. Only one of the pixels is shown in FIG. 1. Pixels located above and below the shown pixel and pixels located on the left and right sides of the shown pixel are similar in structure with the shown pixel.

The liquid crystal display device according to the present invention is used for color representation. Three adjacent pixels showing colors of red, green, and blue form one unit of pixel for color representation. In FIG. 1, one pixel showing color of green is shown as an example.

Furthermore, in the liquid crystal display device according to the present invention, each pixel has functions of transmitting and reflecting light. A virtual line segment a substantially passes across the center of the pixel region, for example, in the x-direction. The upper region located over the virtual line segment is formed as an optically transmissive region TT, while the lower region is formed as an optically reflective region RT.

Substrates are disposed opposite to each other such that a liquid crystal material is sandwiched between them. Gate signal lines GL extending in the x- and y-directions are formed on the liquid-crystal side surface of one substrate SUB1 of the two substrates. The gate signal lines GL surround rectangular regions together with drain signal lines DL (described later). Pixels are formed within the regions.

An insulator film (not shown) is formed on the surface of the substrate SUB1 and provides a cover over the gate signal lines GL. The insulator film acts as a gate insulator film in regions where thin-film transistors (TFTs) (described later) are formed. The insulator film acts as an interlayer dielectric film at the intersections of the gate signal lines GL and the drain signal lines DL.

A semiconductor layer AS is formed in some of locations which are on the upper surface of the insulator film and which overlap the gate signal lines GL. The semiconductor layer AS provides the TFTs. Drain electrodes DT and source electrodes ST are formed on the upper surface of the semiconductor layer AS. As a result, so-called inverted-staggered MIS transistors are built.

The drain electrodes DT and source electrodes ST are formed, for example, at the same time when the drain signal lines DL are formed.

That is, the drain signal lines DL extend in the y-direction on the upper surface of the insulator film and are juxtaposed in the x-direction. Some of the drain signal lines DL extend so as to be formed on the upper surface of the semiconductor layer AS, thus forming drain electrodes DT. Source electrodes ST are also formed on the upper surface of the semiconductor layer AS and spaced from the drain electrodes DT by a distance equal to the channel length. The source electrodes ST have extension portions located outside the region where the semiconductor layer AS is formed, the extension portions extending toward the pixel regions. The extension portions act as connector portions for connection with pixel electrodes PX (described later).

A protective film (not shown) is formed on the surface of the substrate SUB1 and covers the drain signal lines DL. The protective film is formed to prevent direct contact of the TFTs with the liquid crystal material. The protective film is a layer of an inorganic material, an organic material, or a lamination thereof.

The pixel electrodes PX are formed on the upper surface of the protective film. Each of the pixel electrodes PX is made of an optically transmissive pixel electrode PXt and an optically reflective pixel electrode PXr which are electrically connected together.

The optically transmissive pixel electrode PXt is made of ITO, for example, and is formed over the whole region of the central portion of the pixel region excluding slight marginal portions. The optically reflective pixel electrode PXr is made of Al, for example, and is formed on the upper surface of the optically transmissive pixel electrode PXt and in the region under the virtual line segment a.

Thus, where each pixel electrode PX is viewed two-dimensionally, it is partitioned into the region where the optically transmissive pixel electrode PXt is exposed in the pixel region and the region where the optically reflective pixel electrode PXr is exposed. The boundary is delineated by the virtual line segment a.

The substrate SUB1 and another substrate SUB2 are disposed opposite to each other with a liquid crystal material sandwiched therebetween. A black matrix BM is formed on the liquid crystal side of the substrate SUB2 such that the pixel regions are optically shielded at their peripheries (i.e., at the gate signal lines GL, their vicinities, drain signal lines DL, and their vicinities). Therefore, regions PT (hereinafter referred to as the effective pixel regions PT) function substantially as pixel regions is the openings of the black matrix (indicated by the solid line in FIG. 2).

Therefore, the region in which the optically transmissive pixel electrode PXt that is observed within the effective pixel region PT is formed as optically transmissive region TT. The region in which the optically reflective pixel electrode PXr is formed is formed as optically reflective region RT.

An orientation film (not shown) is formed on the upper surface of the substrate SUB1 and covers the optically transmissive pixel electrodes PXt and optically reflective pixel electrodes PXr. The orientation film is in direct contact with the liquid crystal material and limits the initial direction of orientation of the molecules in the liquid crystal material.

A polarizer plate POLL is formed on the surface of the substrate SUB1 that is on the opposite side of the liquid crystal material to visualize the behavior of the liquid crystal material.

The structure of the substrate SUB2 positioned opposite to the substrate SUB1 with the liquid crystal material LC sandwiched therebetween is next described by referring to FIG. 1, which is a cross section taken along line I-I of FIG. 2. The liquid crystal side of the substrate SUB1 shown in FIG. 1 is constructed as follows. Only optically transmissive pixel electrode PXt, optically reflective pixel electrode PXr, and orientation film ROI1 formed so as to cover these electrodes are shown as the structure of the liquid crystal side of the substrate SUB1. To describe the structure of the liquid crystal side of the substrate SUB2, positional relationships with the optically transmissive pixel electrode PXt and optical reflective pixel electrode PXr are required to be known. Therefore, the gate signal lines GL, insulator film, and protective film are omitted.

The black matrix BM is formed on the liquid-crystal side surface of the substrate SUB2. The black matrix BM has been already described in relation to the structure shown in FIG. 2. The black matrix is formed to isolate each pixel region from adjacent pixel regions. Hence, the regions within the openings of the black matrix BM are referred to as the effective pixel regions PT as described previously.

As another embodiment, portions of the black matrix BM (e.g., portions formed along the drain signal lines DL) may be made of a different material and mounted on the side of the substrate SUB1. Also, in this case, the viewer can recognize regions surrounded by the light-shielding film including the black matrix BM as pixels because when the liquid crystal display device is driven, the regions in which brightness can be varied can be identified as the effective pixel regions PT.

A phase plate PL is formed in a region which is located inside the black matrix BM and which is opposite to the optically reflective pixel electrodes PXr.

This phase plate PL acts, for example, as $\frac{1}{2}$-$\lambda$ wave plate, and is used to prevent the phase of light from shifting by $\frac{1}{4}\lambda$ when the light is reflected by the pixel electrodes PXr, the light reciprocating through the phase plate PL.

A color filter FIL is formed on the upper surface of the phase plate PL and covers the phase plate. The filter FIL is green, for example, and is formed on all the effective pixel regions PT. Therefore, marginal portions of the color filter FIL are formed to overlap the black matrix BM. The color filter FIL for green is formed on the black matrix BM in back to back relation to the color filters FIL for red and blue, respectively, which are formed at the other adjacent pixels.

Since each color filter FIL is formed to cover the phase plate PL as described previously, the color filter has portions covering the phase plate PL (optically reflective regions RT) and portions not covering the phase plate PL (optically transmissive regions TT) within the same pixel region. The color filter is thicker in the optically transmissive regions TT and thinner in the optically reflective regions RT.

Light passes through each optically transmissive region TT once but passes through each optically reflective region RT twice. Consequently, the optical distance for the light passing through the color filter FIL can be made substantially equivalent. This effect can be obtained without increasing the number of manufacturing steps. This effect means that if the same pixel region is used either in transmissive mode or reflective mode, color tones exhibited by the color filter FIL are not affected.

Since no orientation film is formed on the upper surface of the phase plate PL, it is possible to prevent the undesirable situation where the phase plate PL is melted by the liquid solution during formation of the orientation film.

A planarization film OC made of a resin is formed on the upper surface on which the color filter FIL is formed. This planarization film OC makes less conspicuous steps, on the side of the liquid crystal material LC, created by the formation of the color filter FIL underlying the planarization film OC.

An optically transparent counter electrode CT is formed from ITO, for example, on the upper surface of the planarization film OC. The counter electrode CT is applied with a voltage providing a basis to the signal supplied to the pixel electrodes PX. A voltage corresponding to the signal is produced between the counter electrode and the pixel electrodes PX. An electric field corresponding to the voltage is produced across the liquid crystal material LC, inducing behavior of the liquid crystal material.

An orientation film ORI2 determining the initial direction of orientation of the molecules of the liquid crystal material is also formed on the upper surface of the counter electrode CT. A polarizer plate POL2 is formed on the surface of the substrate SUB2 that is on the opposite side of the liquid crystal material to visualize the behavior of the liquid crystal material.

Figure 7A:
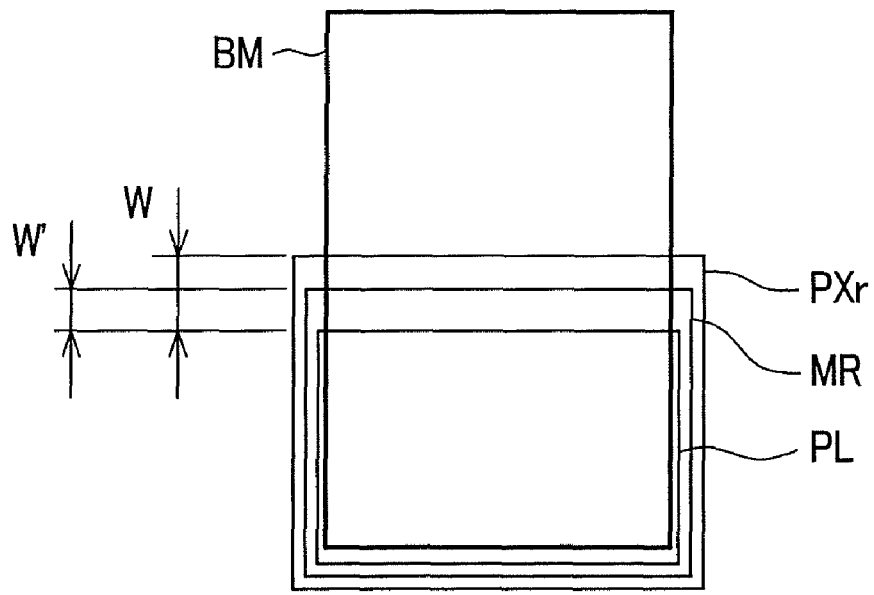
FIGS. 7A and 7B are plan views showing positional relationships among a phase plate, a protrusive film, a reflective electrode, and a black matrix incorporated in a liquid crystal display device according to the invention.

The two-dimensional positional relationship among the pixel electrode PXr, protrusive film MR, and phase plate Pl of the liquid crystal display device fabricated as described above is as shown in FIG. 7A.

In this figure, the protrusive film MR and reflective electrode PXr protrude from the phase plate PL. The protrusive film MR protrudes an amount w' from the phase plate PL. The reflective electrode PXr protrudes an amount w from the phase plate PL. The relation w>w' holds. That is, the protrusive film MR and reflective electrode PXr protrude successively greater amounts from the phase plate PL at their peripheries to reduce leakage of light from the optically reflective regions RT.

Figure 7B:
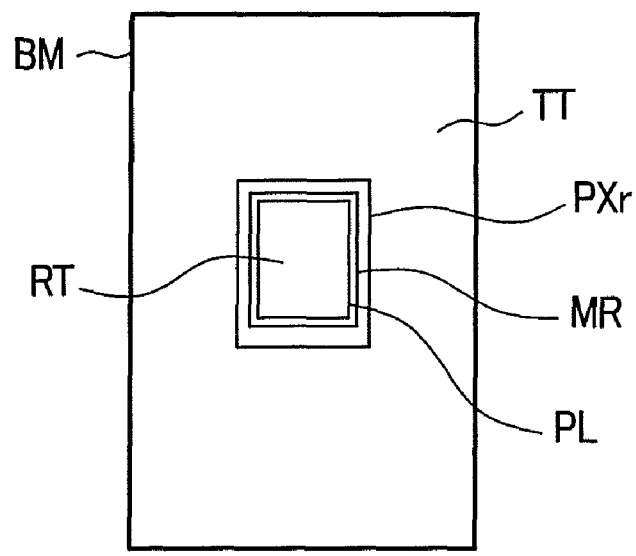

Accordingly, if this relation is satisfied within each effective pixel region PT, satisfactory results will be obtained. This concept leads to a further embodiment as shown in FIG. 7B. That is, the optically reflective region RT is placed in the center of the pixel region. The optically transmissive region TT is formed around it. The pixel electrode PXr, protrusive film MR, and phase plate PL need to satisfy the above-described relationship over the whole region of their peripheries.

In the liquid crystal display device of the structure described above, the black matrix BM, phase plate PL, color filters FIL, and planarization film OC are formed, for example, in this order on the liquid-crystal side surface of the substrate SUB2. One example of method of fabricating the phase plate PL is described now.

Figures 3A, 3B:
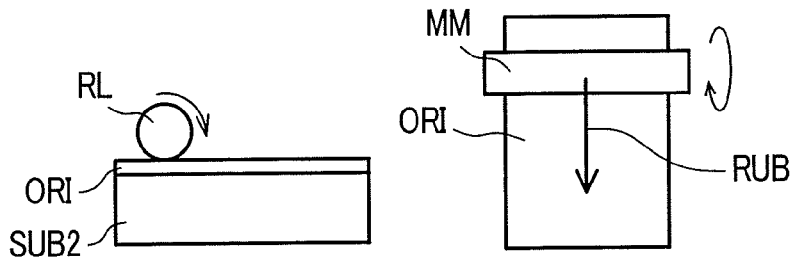
FIGS. 3A and 3B are cross sections, illustrating a process sequence for fabricating a phase plate incorporated in a liquid crystal display device according to the invention.

FIGS. 3A and 3B illustrate a process sequence for forming the orientation film ORI for formation of the phase plate. FIG. 3A is a schematic cross section. FIG. 3B is a schematic plan view.

First, as shown in FIG. 3A, the substrate SUB2 is prepared. The black matrix BM has been already formed on the liquid-crystal side surface of the substrate SUB2. The orientation film ORI for orientation control is applied to the same surface and rubbed. This rubbing operation is carried out, for example, by rotating a rubbing roll RL on the upper surface of the orientation film ORI as shown.

Figures 4A, 4B, 4C:
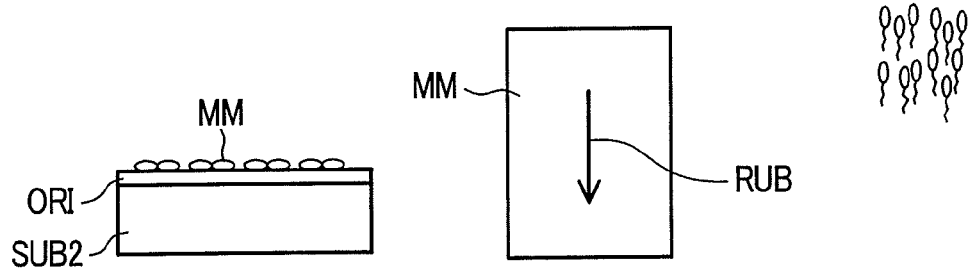
FIGS. 4A, 4B, and 4C are cross sections, illustrating a process sequence for fabricating a phase plate incorporated in a liquid crystal display device according to the invention.

Then, a UV curable liquid crystal material MM (such as RMS03-001 available from Merck) forming the phase plate is applied. FIG. 4A is a schematic cross section. FIG. 4B is a schematic plan view. By forming the liquid crystal material MM on the rubbed orientation film ORI, the molecules of the material are oriented in accordance with the orientation direction RUB of the orientation film ORI. FIG. 4C is a schematic plan view showing the manner in which the molecules of the material MM are oriented in the orientation direction RUB.

Figures 5A, 5B, 5C:
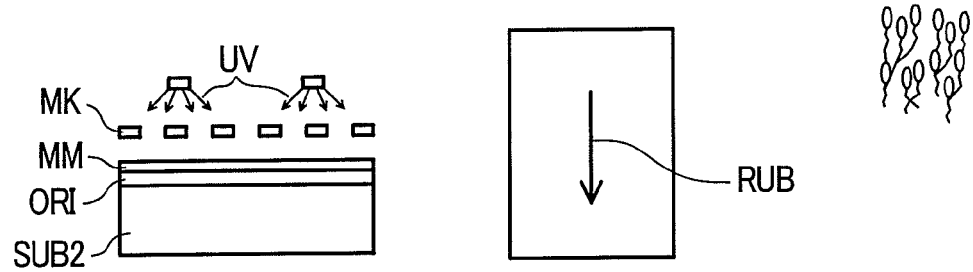
FIGS. 5A, 5B, and 5C are cross sections, illustrating a process sequence for fabricating a phase plate incorporated in a liquid crystal display device according to the invention.

Then, the UV curable liquid crystal material MM is selectively irradiated with UV light via a mask MK, changing the material into a film. FIG. 5A is a schematic cross section. FIG. 5B is a schematic plan view. Selective exposure to UV light is performed, for example, at portions which are left as the phase plate PL. The portions irradiated with UV light undergo photopolymerization.

The phase plate PL which is formed by the formation of the film has a phase axis extending along the direction of rubbing RUB as schematically shown in FIG. 5C.

Figures 6A, 6B, 6C:
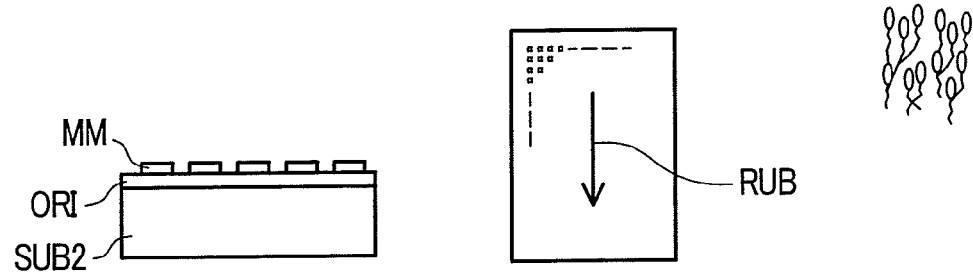
FIGS. 6A, 6B, and 6C are cross sections, illustrating a process sequence for fabricating a phase plate incorporated in a liquid crystal display device according to the invention.

The phase plate PL is then developed, thus performing patterning. FIG. 6A is a schematic cross section. FIG. 6B is a schematic plan view. FIG. 6C is a schematic plan view, showing the manner in which the phase axis has been formed.

As a subsequent process step, the color filter FIL is formed.

In the liquid crystal display device shown in FIG. 2, the counter electrode CT is formed on the side of the substrate SUB2. Obviously, the counter electrode may be formed on the side of the substrate SUB1 together with the pixel electrodes PX.

Figure 8:
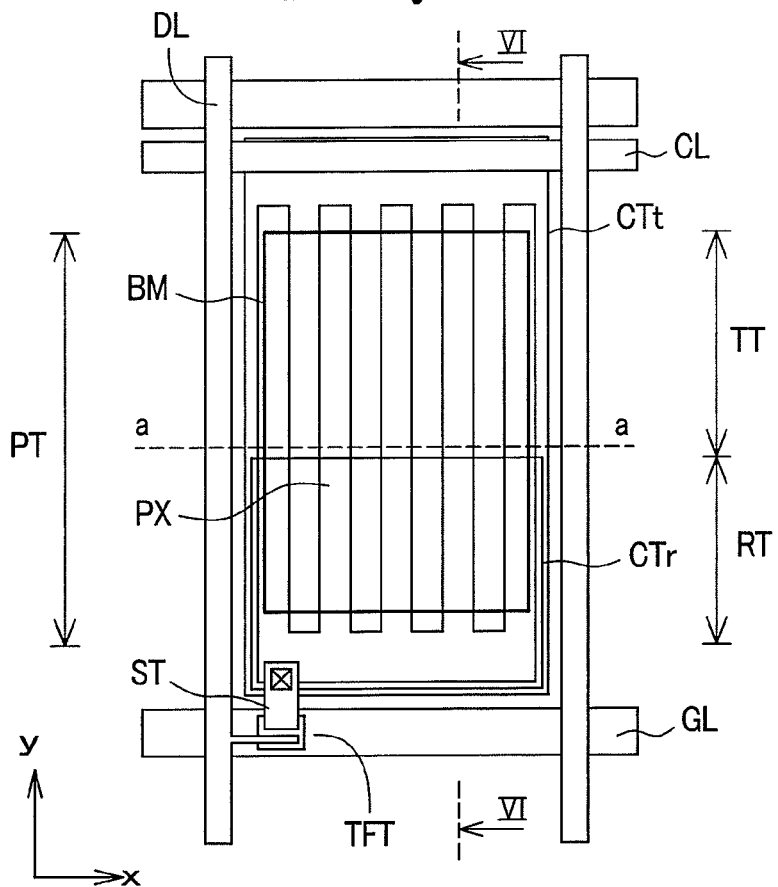
FIG. 8 is a plan view showing another pixel structure of a liquid crystal display device according to the invention.

In this case, a structure as shown in FIG. 8 is adopted as one embodiment. FIG. 8 is drawn in a corresponding manner to FIG. 2, for example. The arrangement of gate signal lines GL, drain signal lines DL, and TFTs and their structures are similar with the arrangement and structures shown in FIG. 1. The differences with the structures shown in FIG. 2 are the pixel electrodes PX and a newly prepared counter electrode CT.

In FIG. 8, an optically transmissive counter electrode CTt and an optically reflective counter electrode CTr are successively overlapped in each pixel region of the substrate SUB1.

The electrodes are patterned such that the counter electrode CTt is exposed in the optically transmissive region TT and that the counter electrode CTr is exposed in the optically reflective region RT. The counter electrodes CT (i.e., CTt and CTr) are electrically connected with counter voltage signal lines CL which are close and parallel, for example, to the gate signal lines GL. A reference voltage is applied via the counter voltage signal lines CL. The counter voltage signal lines CL are formed at the same time, for example, as when the gate signal lines GL are formed. The signal lines CL and GL are both made of the same material.

On the other hand, the pixel electrodes PX are formed as a layer over an insulator film or films. The counter electrodes CT are positioned under the insulator film. For example, the pixel electrodes are made of belt-like electrodes which extend in the y-direction and are juxtaposed in the x-direction.

The electrodes are connected together, for example, at ends of the TFTs, and are connected with the source electrodes ST of the TFTs through contact holes formed in the insulator film. Although the numerical aperture of the pixels can be improved by forming the pixel electrodes PX from an optically transparent material, the material is not limited to it. A non-transparent material may also be used.

When signals supplied via the TFTs are applied to the pixel electrodes PX, an electric field is produced between each pixel electrode and the counter electrode, causing behavior of the liquid crystal material.

In this case, the electric field is principally substantially parallel to the surface of the substrate SUB1. Besides, an electric field is produced vertical to the edges of the pixel electrodes PX. Thus, the liquid crystal material LC is driven.

Figure 9:
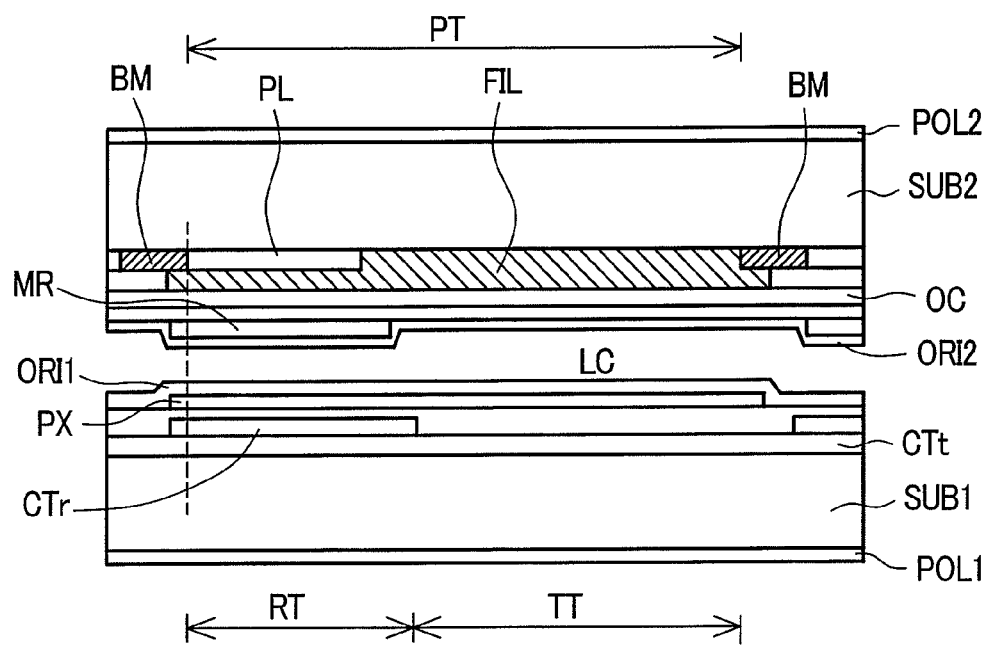
FIG. 9 is a cross-sectional view taken on line VI-VI of FIG. 8.

A cross section taken on line VI-VI of FIG. 8 is shown in FIG. 9, which is drawn in a corresponding manner to FIG. 1. The configuration on the side of the substrate SUB2 is similar to the configuration shown in FIG. 1. That is, black matrix BM, phase plate PL, color filters FIL, protrusive film MR, and other components are formed, using the effective pixel regions PT, optically reflective regions RT, and optically transmissive regions TT as a reference.

The embodiments described above can be used alone or in combination because the advantages of each embodiment can be exhibited alone or in combination.

In the liquid crystal display device in the present embodiment, each pixel has both optically transmissive and optically reflective regions. Obviously, the present invention can also be applied to a structure in which the optically transmissive and optically reflective regions are assigned to the pixels.

Furthermore, the invention is not limited to this structure. Of course, the invention can be applied to every kind of liquid crystal display device having a built-in phase plate. In this case, the invention can be applied if the functions of this phase plate are slightly different from those of the aforementioned phase plate.

What is claimed is:

1. A liquid crystal display device comprising:
   a first substrate and a second substrate disposed opposite to each other with a liquid crystal material sandwiched therebetween;
   a pixel having an optically transmissive portion and an optically reflective portion;
   a phase plate which is formed between the second substrate and the liquid crystal material in the optically reflective portion of the pixel;
   a color filter which is formed between the second substrate and the liquid crystal material in the optically transmissive portion of the pixel and between the phase plate and the liquid crystal material in the optically reflective portion of the pixel;
   a counter electrode which is formed between the color filter and the liquid crystal material; and
   a pixel electrode which is formed between the first substrate and the liquid crystal material;
   wherein a protrusive film is formed over the phase plate and has a width in a plane of the protrusive film which is greater than a width of the phase plate in a plane thereof.

2. A liquid crystal display device according to claim 1, wherein the color filter is made thinner in a portion where the color filter overlaps the phase plate than in a portion where the color filter does not overlap the phase plate.

3. A liquid crystal display device comprising:
   a first substrate and a second substrate disposed opposite to each other with a liquid crystal material sandwiched therebetween; and
   a pixel having an optically transmissive portion and an optically reflective portion;
   wherein a phase plate is formed between the second substrate and the liquid crystal material in the optically reflective portion;
   a color filter is formed between the second substrate and the liquid crystal material in the optically transmissive portion and between the phase plate and the liquid crystal material in the optically reflective portion;
   a counter electrode is formed between the first substrate and the liquid crystal material; and
   a pixel electrode is formed between the first substrate and the liquid crystal material;
   wherein a protrusive film is formed over the phase plate and has a width in a plane of the protrusive film which is greater than a width of the phase plate in a plane thereof.

4. A liquid crystal display device according to claim 3, wherein the color filter is made thinner in a portion where the color filter overlaps the phase plate than in a portion where the color filter does not overlap the phase plate.

5. A liquid crystal display device according to claim 3, wherein the pixel electrode overlaps the counter electrode via an insulator film.

6. A liquid crystal display device according to claim 1, wherein the protrusive film has a length in the plane of the protrusive film which is greater than a length of the phase plate in the plane thereof.

7. A liquid crystal display device according to claim 6, wherein an optically reflective portion of the pixel electrode has a width and length in a plane of the pixel electrode which are greater than the width and length of the phase plate in the plane thereof and which are greater than the width and length of the protrusive film in the plane thereof.

8. A liquid crystal display device according to claim 3, wherein the protrusive film has a length in the plane of the protrusive film which is greater than a length of the phase plate in the plane thereof.

9. A liquid crystal display device according to claim 8, wherein an optically reflective portion of the pixel electrode has a width and length in a plane of the pixel electrode which are greater than the width and length of the phase plate in the plane thereof and which are greater than the width and length of the protrusive film in the plane thereof.

* * * * *